United States Patent
Bissontz

(10) Patent No.: US 8,056,661 B2
(45) Date of Patent: Nov. 15, 2011

(54) MOTOR VEHICLE WITH SYSTEM FOR CONDITIONING POWER TAKE-OFF ENABLEMENT ON AN ENGINE COMPARTMENT BEING CLOSED

(75) Inventor: Jay E. Bissontz, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 317 days.

(21) Appl. No.: 12/511,156

(22) Filed: Jul. 29, 2009

(65) Prior Publication Data

US 2011/0024209 A1 Feb. 3, 2011

(51) Int. Cl.
*B60W 10/30* (2006.01)
(52) U.S. Cl. .............. 180/65.27; 180/53.8; 180/69.2
(58) Field of Classification Search ............ 180/69.2, 180/69.21, 65.25, 65.27, 53.1, 53.4, 53.5, 180/53.7, 53.8; 192/135
See application file for complete search history.

(56) References Cited

U.S. PATENT DOCUMENTS

| 5,669,842 A * | 9/1997 | Schmidt ............................ 475/5 |
| 7,104,920 B2 * | 9/2006 | Beaty et al. ....................... 477/5 |
| 2009/0255775 A1 * | 10/2009 | Viaud ............................ 192/135 |

* cited by examiner

*Primary Examiner* — John Walters
(74) *Attorney, Agent, or Firm* — Jeffrey P. Calfa; Mark C. Bach

(57) ABSTRACT

A motor vehicle with a system for conditioning power take-off enablement has a powerplant, including an internal combustion engine, for propelling the vehicle. The powerplant is disposed within a compartment. A hood is positionable relative to the compartment to selectively allow and disallow access to the compartment. A power take-off unit comprises an input mechanically coupled to the powerplant and selectively enabled by a controller for coupling an output of the power take-off unit to the input of the power take-off unit when enabled by the controller and uncoupling the output of the power take-off unit from the input of the power take-off unit when not enabled by the controller. A device whose status distinguishes between the hood allowing access to the compartment and the hood disallowing access to the compartment causes the controller not to enable the power take-off unit when the device discloses that the hood is allowing access to the compartment.

3 Claims, 3 Drawing Sheets

MOTOR VEHICLE WITH SYSTEM FOR CONDITIONING POWER TAKE-OFF ENABLEMENT ON AN ENGINE COMPARTMENT BEING CLOSED

TECHNICAL FIELD

This disclosure relates to motor vehicles that at times use their engines to operate accessory devices or equipment via power take-offs. Such vehicles include, for example, commercial utility vehicles that use power take-offs to operate equipment such as hydraulic pumps.

BACKGROUND OF THE DISCLOSURE

Such a vehicle typically has a front-end engine compartment containing a powerplant, such as an internal combustion or hybrid-electric engine, that powers the vehicle. The engine is part of the vehicle's powertrain which in a rear wheel drive vehicle comprises a transmission coupled to the engine, a driveshaft coupling the transmission to a differential of a rear axle, and driven road wheels at the ends of the axle.

The power take-off unit has an input that is coupled either to the engine or to the transmission. While there are various types of power take-off units, they share a common characteristic of having a mechanism that is controlled in some manner for selectively coupling and uncoupling the unit's output to and from the unit's input.

A typical front-end engine compartment is essentially closed along its sides and top, but is partially open at the front to allow air to pass through a radiator that is disposed between the frontal opening and the engine to allow air to pass through a radiator in the engine cooling system and the engine compartment and eventually to exit by passing downward and under the vehicle body. Access to the engine compartment interior is available by opening a hood of the vehicle.

Although access to the engine compartment and its contents is restricted when the hood is closed, it may be possible for the engine to be cranked and started by operating the usual ignition switch in the occupant compartment of the vehicle while the hood is open. It may also be possible for the hood to be opened while the engine is running. Opening the hood to access the engine, either when running or when being cranked and started by the ignition switch, may be important for diagnostic or other purposes.

SUMMARY OF THE DISCLOSURE

Embodiments disclosed herein relate to a motor vehicle with a system for conditioning power take-off enablement. In one embodiment, the motor vehicle comprises a powerplant, including an internal combustion engine, for propelling the motor vehicle. The powerplant is housed in a compartment. A hood is positionable relative to the compartment to selectively allow and disallow access to the compartment. A power take-off unit comprises an input mechanically coupled to the powerplant and is selectively enabled by a controller for coupling an output of the power take-off unit to the input of the power take-off unit when enabled by the controller and uncoupling the output of the power take-off unit from the input of the power take-off unit when not enabled by the controller is included. A device whose status distinguishes between the hood allowing access to the compartment and the hood disallowing access to the compartment for causing the controller not to enable the power take-off unit when the device discloses that the hood is allowing access to the compartment is provided.

DETAILED DESCRIPTION

Embodiments disclosed herein relate to a motor vehicle with a system for conditioning power take-off enablement. For example in a parallel-configured hybrid-electric vehicle, an engaged power take-off may be operating an accessory, such as a hydraulic pump, using the electric motor/generator as an electric motor while the internal combustion engine is shut off. Should the state-of-charge of the DC battery bank that is powering the electric motor/generator deplete to a level at which the battery bank needs to be re-charged, an automatic start routine in a controller will crank and start the internal combustion engine to continue operation of the accessory that is being operated via the power take-off while also restoring battery bank state-of-charge.

If the engine compartment is open when this occurs, a person who might be working on the engine or equipment in the engine compartment is apt to be surprised and possibly exposed to suddenly moving parts on the exterior of the engine, such as drive belts and pulleys.

The present disclosure provides a system and method for avoiding exposure of personnel to such a situation.

One general aspect of this disclosure relates to a motor vehicle comprising a powerplant, including an internal combustion engine, for propelling the vehicle, a compartment within which the powerplant is housed, a hood that is positionable relative to the compartment to selectively allow and disallow access to the compartment, a power take-off unit that comprises an input mechanically coupled to the powerplant and that is selectively enabled by a controller for coupling an output of the power take-off unit to the input of the power take-off unit when enabled by the controller and uncoupling the output of the power take-off unit from the input of the power take-off unit when not enabled by the controller, and a device whose status distinguishes between the hood allowing access to the compartment and the hood disallowing access to the compartment for causing the controller not to enable the power take-off unit when the device discloses that the hood is allowing access to the compartment.

Another embodiment provides a method for controlling a controller that selectively enables a power take-off unit to couple an output of the power take-off unit to an input of the power take-off unit that is coupled to a powerplant disposed in a compartment of a motor vehicle having a hood that is positionable relative to the compartment to selectively allow and disallow access to the compartment. The method comprises disallowing the controller to enable the power take-off unit when the hood is allowing access to the compartment.

Figure 1:
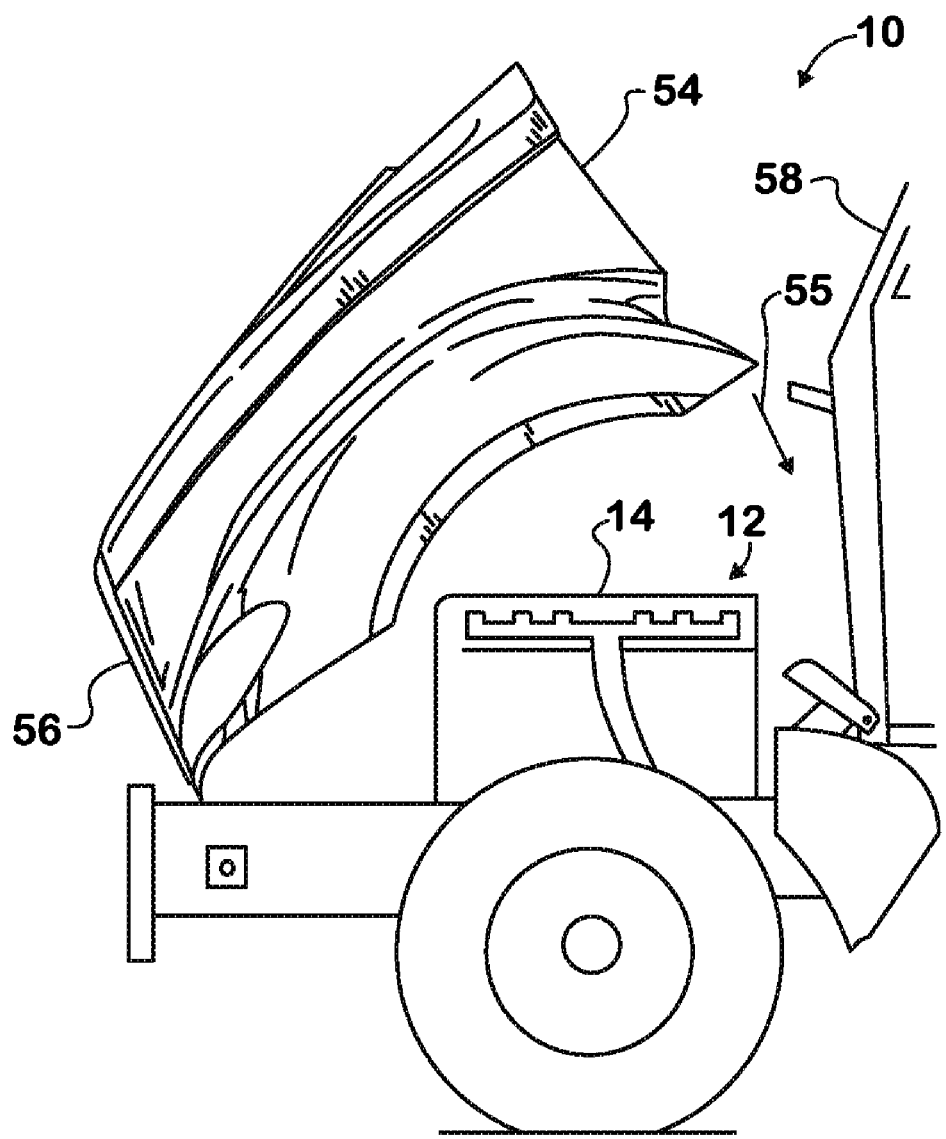
FIG. 1 is partial side elevation view of a portion of a vehicle.
Figure 3:
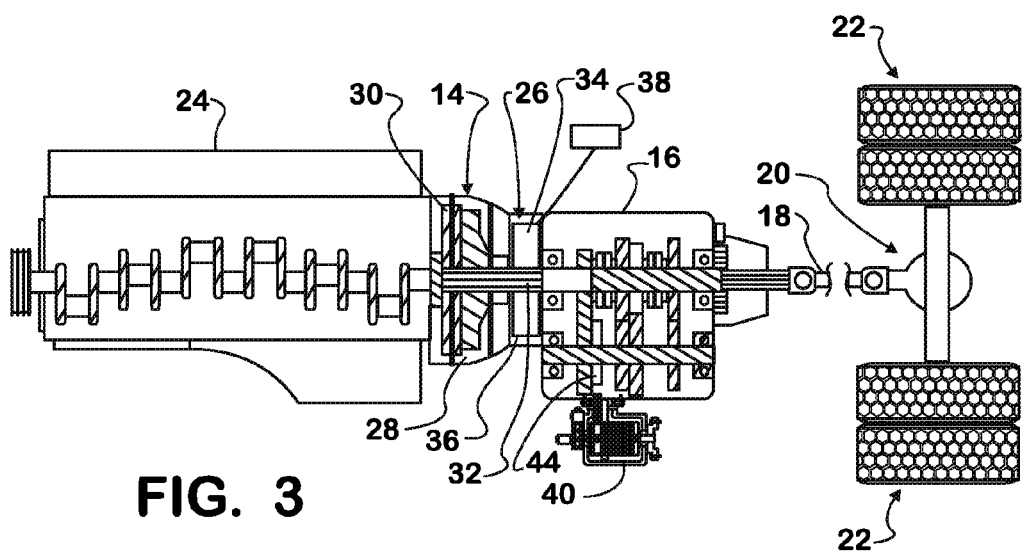
FIG. 3 is a diagram showing a portion of the vehicle's powertrain, including a power take-off.

FIG. 1 shows an example of a vehicle 10 that has a front-end engine compartment 12 housing a hybrid-electric engine 14 for propelling the vehicle via a drivetrain, shown in FIG. 3 to comprise a transmission 16, a driveshaft 18, and a rear axle 20 having driven road wheels 22 at its ends.

Engine 14 comprises an internal combustion engine 24 and an electric motor/generator 26. A clutch 28 is disposed between a flywheel 30 and a shaft 32 coming from transmission 16 for selectively engaging and disengaging the flywheel with and from the shaft.

Electric motor/generator 26 comprises an armature 34 that is splined to shaft 32 and a stator 36 electromagnetically coupled with the armature. When motor/generator 26 is operating as a motor that is powered by a battery bank 38, it delivers torque to shaft 32, adding propulsion torque to the drivetrain. During vehicle deceleration, motor/generator 26 operates as a generator that delivers charge to battery bank 38.

When clutch 28 is engaged, engine 24 can deliver torque to shaft 32. When clutch 28 is disengaged, engine 24 can deliver no torque to shaft 32 and it is not an additional load on the drivetrain.

Figure 4:
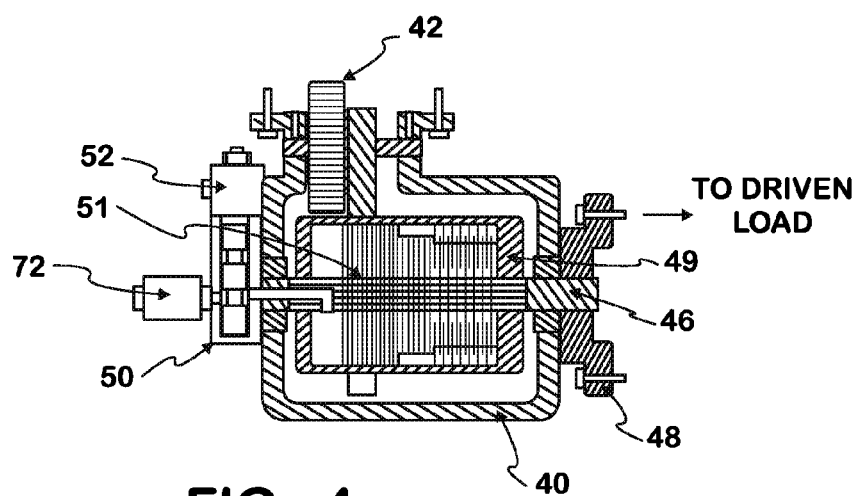
FIG. 4 is cross section through the power take-off on a larger scale.

A power take-off unit 40 is shown mounted on transmission 16 in FIG. 3. Unit 40, details of which are better shown on a larger scale in FIG. 4, has an input gear 42 operatively coupled with a gear 44 in transmission 16 for causing an output shaft 46 of unit 40 to turn when shaft 32 is turning and unit 40 is engaged to couple gear 42 to shaft 46. A coupling 48 on the exterior of unit 40 provides an operative coupling of shaft 46 to a driven load, such as a hydraulic pump.

Unit 40 has an internal mechanism 49, shown by way of example as a clutch, for selectively connecting shaft 46 to, and disconnecting shaft 46 from, gear 42 to correspondingly engage, and disengage, unit 40. While the mechanism itself is basically mechanical, an electromagnetic-actuated fluid control valve 50 is the device that performs the engagement and disengagement via a fluid- or pneumatic-actuated piston 51. Valve 50 itself is controlled by an electromagnetic actuator 52 that is electrically connected with a controller 60 shown in FIG. 2. A switch 72 on valve 50 discloses when controller 60 is causing actuator 52 to operate valve 50 to a condition that allows fluid or pneumatic pressure provided by a source, such as an air tank or transmission charge oil pump to force piston 51 to engage mechanism 49.

In FIG. 1, a hood 54 of vehicle 10 is shown swung open to allow access to engine compartment 12 and its contents. When swung down as suggested by arrow 55, hood 54 closes engine compartment 12 from the top and sides. Hood 54 is partially open however through a grille at the front 56 to allow air to pass through a radiator that is disposed between the grille and engine 24 as an element of the engine's cooling system. Air passing that has passed through the radiator flows through the engine compartment 12 eventually exits by passing downward and under the vehicle body 58 that is immediately rearward of compartment 12.

Figure 2:
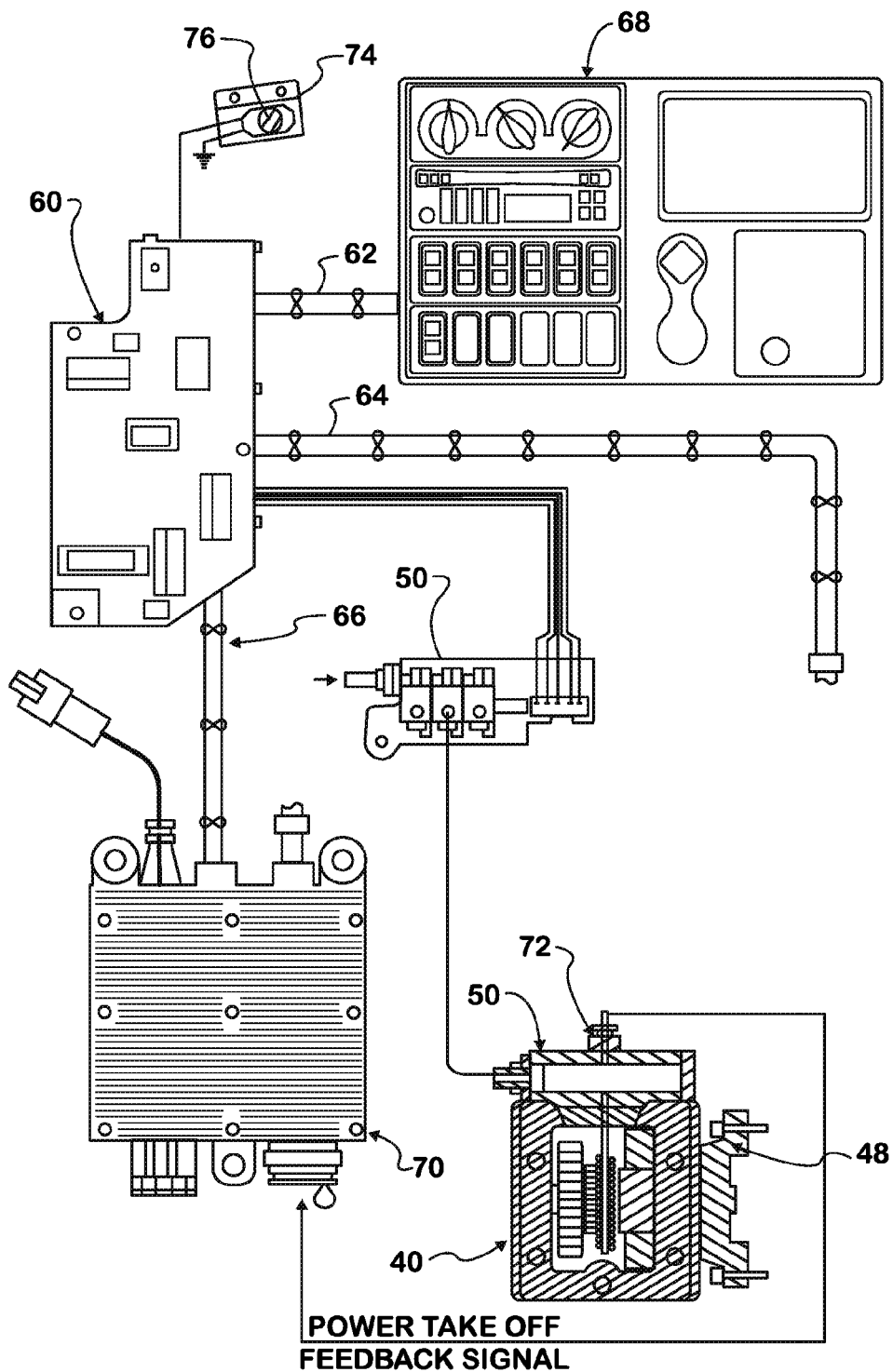
FIG. 2 is a schematic diagram showing portions of the vehicle relevant to the present disclosure.

FIG. 2 shows a portion of an electrical system of vehicle 10 to comprise an electronics system controller (ESC) 60 and associated data links such as 62, 64, 66 via which ESC 60 can communicate with other devices in the electrical system, including an instrument panel module 68 within an occupant compartment of body 58.

Power take-off unit 40 (FIG. 2 shows a different model from the one in FIGS. 3 and 4) is selectively enabled by ESC 60 for allowing equipment connected to coupling 48 to be operated by engine 14. When ESC 60 is enabling unit 40, actuator 52 operates valve 50 to cause pressurized fluid from an on-board source to act on the internal engagement/disengagement mechanism of unit 40 and cause the power take-off's output to become coupled to its input. When ESC 60 is not enabling unit 40, valve 50 doesn't allow pressurized fluid to be effective on the engagement/disengagement mechanism of unit 40, consequently disconnecting the power take-off's output from its input.

Vehicle 10 also has a remote power module (RPM) 70 that can provide electricity to various electrical equipment that may or may not be associated with the equipment being operated by the power take-off. RPM 70 is enabled by a signal given by a switch 72 on valve 50 that discloses when power take-off unit 40 is being enabled by ESC 60. Once enabled, RPM 70 broadcasts its enabled condition via data link 66 for potential use by other devices or systems. In this way enablement of RPM 70 is conditioned on engagement of power take-off unit 40. Alternatively, the engaged condition of unit 40 could be directly broadcast on a data link.

ESC 60 conditions enablement of unit 40 and RPM 70 by an enablement strategy that includes the status of hood 54. The status of hood 54 as being either open or closed is given to ESC 60 by a switch 74 associated with the hood. Switch 74 comprises an suitable mechanism such as a gravity-responsive rolling magnet 76 that can roll internally from one end to the other depending on the inclination of the hood. The orientation of the switch is set such that the switch will indicate that the hood is closed when it is raised no more than some minimal amount and that the hood is open when raised beyond that amount.

What is claimed is:

1. A motor vehicle with a system for conditioning power take-off enablement, the motor vehicle comprising:
    a powerplant, including an internal combustion engine, for propelling the motor vehicle;
    a compartment within which the powerplant is housed;
    a hood that is positionable relative to the compartment to selectively allow and disallow access to the compartment;
    a power take-off unit that comprises an input mechanically coupled to the powerplant and that is selectively enabled by a controller for coupling an output of the power take-off unit to the input of the power take-off unit when enabled by the controller and uncoupling the output of the power take-off unit from the input of the power take-off unit when not enabled by the controller;
    a device whose status distinguishes between the hood allowing access to the compartment and the hood disallowing access to the compartment for causing the controller not to enable the power take-off unit when the device discloses that the hood is allowing access to the compartment; and
    an electrical power unit for delivering electricity to electrically-operated equipment associated with the motor vehicle and in which the electrical power unit is selectively enabled by a signal from the power take-off unit disclosing that the power take-off unit is being enabled by the controller.

2. The motor vehicle as set forth in claim 1 further comprising:
    a display operatively associated with the device for visually disclosing status of the device.

3. The motor vehicle as set forth in claim 1 in which the powerplant includes an electric motor-generator cooperatively arranged with the internal combustion engine in a parallel hybrid configuration.

* * * * *